(12) United States Patent
Abdel Nour et al.

(10) Patent No.: US 12,157,565 B2
(45) Date of Patent: Dec. 3, 2024

(54) AIRCRAFT WING

(71) Applicant: LEONARDO S.P.A., Rome (IT)

(72) Inventors: Pierre Abdel Nour, Samarate (IT); Paolo Brughera, Samarate (IT); Carlo Cassinelli, Samarate (IT)

(73) Assignee: LEONARDO S.P.A., Rome (IT)

( * ) Notice: Subject to any disclaimer, the term of this patent is extended or adjusted under 35 U.S.C. 154(b) by 260 days.

(21) Appl. No.: 17/416,115

(22) PCT Filed: Oct. 31, 2019

(86) PCT No.: PCT/IB2019/059364
§ 371 (c)(1),
(2) Date: Jun. 18, 2021

(87) PCT Pub. No.: WO2020/136461
PCT Pub. Date: Jul. 2, 2020

(65) Prior Publication Data
US 2022/0073185 A1 Mar. 10, 2022

(30) Foreign Application Priority Data
Dec. 28, 2018 (EP) .................................. 18248246

(51) Int. Cl.
*B64C 3/50* (2006.01)
*B64C 3/18* (2006.01)
(Continued)

(52) U.S. Cl.
CPC ............... *B64C 3/50* (2013.01); *B64C 3/185* (2013.01); *B64C 3/187* (2013.01); *B64C 9/02* (2013.01);
(Continued)

(58) Field of Classification Search
CPC ........ B64C 3/50; B64C 2003/14; B64C 27/52
See application file for complete search history.

(56) References Cited

U.S. PATENT DOCUMENTS 1,974,407 A   9/1934 Barnhart
3,035,789 A * 5/1962 Young ................. B64C 29/0033
                                                    244/7 C
(Continued)

FOREIGN PATENT DOCUMENTS

CN    104512546 A  *  4/2015  ............... B64C 9/02
CN    104903191        9/2015
(Continued)

OTHER PUBLICATIONS

Chinese Office Action in CN Application No. 2019800869291, mailed Aug. 29, 2023 (12 pages) an English translation attached hereto.

*Primary Examiner* — Assres H Woldemaryam
*Assistant Examiner* — Anna L. Gordon
(74) *Attorney, Agent, or Firm* — Leason Ellis LLP (57) ABSTRACT

A wing having a wing box (20) defining a first wing profile with a first leading edge, a first trailing edge, a first top surface and a first bottom surface; a first appendage hinged on the wing box and defining a second wing profile, in turn comprising an end wall and a second trailing edge, a second top surface and a second bottom surface; the first appendage is movable between: a first position, in which the first and the second wing profiles are contiguous with each other and a second position, in which the second bottom surface and second top surface are respectively separated from the first bottom surface and first top surface; the wing box comprises a first spar having a curved section in a plane orthogonal to the associated first axis; the end wall is curved and arranged abutting against the first spar at least along the second top surface and the second bottom surface when the first movable appendage is in the first position.

16 Claims, 8 Drawing Sheets

(51) Int. Cl.
  *B64C 9/02* (2006.01)
  *B64C 13/30* (2006.01)
  *B64C 27/46* (2006.01)
  *B64C 27/52* (2006.01)
  *B64C 29/00* (2006.01)
  *B64D 29/02* (2006.01)

(52) U.S. Cl.
  CPC ............ *B64C 13/30* (2013.01); *B64C 27/463* (2013.01); *B64C 27/52* (2013.01); *B64C 29/0033* (2013.01); *B64D 29/02* (2013.01)

(56) References Cited

U.S. PATENT DOCUMENTS

| | | | |
|---|---|---|---|
| 3,179,354 A * | 4/1965 | Alvarez-Calderon | ........................ B64C 23/08 244/206 |
| 3,586,262 A * | 6/1971 | Sherman | ............. B64C 29/0033 244/7 R |
| 3,985,319 A | 10/1976 | Dean et al. | |
| 4,834,326 A * | 5/1989 | Stache | ...................... B64C 9/18 244/210 |
| 5,564,655 A * | 10/1996 | Garland | .................... B64F 5/10 33/1 BB |
| 8,544,787 B2 * | 10/2013 | Lee | ..................... B64C 29/0033 244/12.4 |
| 9,376,206 B2 * | 6/2016 | Ross | ...................... B64D 35/04 |
| 2006/0169848 A1 | 8/2006 | Libby | |
| 2017/0174313 A1 * | 6/2017 | Brakes | ...................... B64C 9/16 |
| 2017/0225767 A1 | 8/2017 | King et al. | |
| 2017/0305567 A1 | 10/2017 | Williams et al. | |
| 2018/0162525 A1 * | 6/2018 | St. Clair | .............. B64C 29/0025 |
| 2019/0112028 A1 * | 4/2019 | Williams | ................ B64D 27/12 |
| 2020/0148331 A1 * | 5/2020 | Bensmann | ................ B64C 9/24 |

FOREIGN PATENT DOCUMENTS

| | | | |
|---|---|---|---|
| CN | 109070994 | | 12/2018 |
| EP | 2727825 | | 5/2014 |
| GB | 518670 | | 3/1940 |
| JP | 2017081360 A | * | 5/2017 |
| WO | WO-9105699 A | * | 5/1991 ............... B64C 3/50 |

* cited by examiner

AIRCRAFT WING

CROSS-REFERENCE TO RELATED APPLICATIONS

This patent application is a U.S. National Phase Application under 35 U.S.C. § 371 of International Patent Application No. PCT/IB2019/059364, filed on Oct. 31, 2019, which claims priority from European patent application no. 18248246.3, filed on Dec. 28, 2018, all of which are incorporated by reference, as if expressly set forth in their respective entireties herein.

TECHNICAL FIELD

The present invention relates to a wing for an aircraft.

In particular, the present invention relates to a wing for a hover-capable aircraft, such as a convertiplane or a gyrodyne for example.

BACKGROUND ART

In the aviation industry, aeroplanes are normally used for high cruising speeds, in particular above 150 knots and at high altitudes, for example above 30,000 feet. For high cruising speeds and altitudes, aeroplanes use fixed wings to generate the lift necessary for sustaining the aeroplane in the air. A sufficient amount of lift can only be achieved by accelerating the aeroplane on quite long runways. These runways are also needed to allow aeroplanes to land.

Contrariwise, helicopters generate the necessary lift through rotation of the main rotor's blades. Consequently, helicopters can take-off/land without the need for horizontal speed and using particularly small areas. Moreover, helicopters are capable of hovering and of flying at relatively low altitudes and speeds, thereby being particularly easy to handle and adapted for demanding manoeuvres, such as mountain or sea rescue operations.

Nevertheless, helicopters have intrinsic limits regarding the maximum operating altitude, which is around 20,000 feet and the maximum operating speed, which cannot exceed 150 knots.

In order to meet the demand for aircrafts capable of having the same maneuverability and ease of use of the helicopter and, at the same time, overcome the intrinsic limits indicated above, convertiplanes and gyrodynes are known.

In greater detail, known types of convertiplanes basically comprise:

a fuselage extending along a first longitudinal axis;
 a pair of cantilever wings projecting from opposite sides of the fuselage and having respective free ends opposite to the fuselage and aligned along a second transversal axis substantially orthogonal to the first longitudinal axis;
 a pair of nacelles carrying respective engines and fixed with respect to the associated wings; and
 a pair of rotors rotatable about respective third axes and operatively connected to the respective engines.

In this embodiment solution, for example in the BELL V-280 aircraft, the rotors are tiltable with respect to the associated engines and nacelles and the associated wing about a related fourth axis parallel to the second axis.

Each rotor comprises, in a known manner, a drive shaft rotatable about the corresponding third axis and a plurality of blades hinged on the drive shaft, in particular distributed circumferentially around the free end of the drive shaft that protrudes from the respective nacelle.

The rotors are connected to each other by an interconnection shaft, which ensures operation of both rotors in the event of one of the engines failing. In the known solutions, this interconnection shaft extends outside the convertiplane and is therefore exposed to atmospheric agents.

Convertiplanes are also able to selectively assume:

an "aeroplane" configuration, in which the rotors are arranged with the respective third axes substantially parallel to the first axis of the convertiplane; or
 a "helicopter" configuration, in which the rotors are arranged with the respective third axes substantially vertical and transversal to the first axis of the convertiplane.

Due to the possibility of tilting the rotors, convertiplanes are able to take off and land like a helicopter, i.e. in a direction substantially perpendicular to the first longitudinal axis of the convertiplane, without the need of a runway.

Furthermore, convertiplanes are also able to take off and land on rough terrain and without generating noise levels incompatible with urban areas.

In addition, convertiplanes are capable of hovering when arranged in the helicopter configuration.

Convertiplanes can also reach and maintain cruising speeds of approximately 250-300 knots and flight altitudes in the order of 30,000 feet when arranged in the aeroplane configuration.

This cruising speed is much higher than the roughly 150 knots defining the maximum cruising speed for helicopters.

Similarly, the aforementioned altitude is much higher than that typical of helicopters and enables convertiplanes arranged in the aeroplane configuration to avoid the clouds and atmospheric disturbances characteristic of lower altitudes.

In addition to the components normally present on a known helicopter, such as a main rotor with a vertical axis for example, gyrodynes, such as the EUROCOPTER X-3 aircraft for example, comprise a pair of cantilever wings projecting from respective parts of the gyrodyne's fuselage, along a transversal axis substantially orthogonal to the aircraft's longitudinal axis and the main rotor's rotation axis.

In greater detail, each of the wings carries a respective propeller that comprises, in a known manner, a drive shaft powered by an associated engine and a plurality of blades hinged on the drive shaft itself.

In particular, each drive shaft is rotatable about an associated axis substantially parallel to the gyrodyne's longitudinal axis, i.e. a horizontal axis.

The gyrodyne is thus able to fly, in the same way as a convertiplane, to take off and land in a vertical direction via the main rotor and to fly in forward flight via the propellers and the aforementioned wings.

During forward flight, the main rotor freewheels, while thrust is generated by the propellers.

Independently of whether dealing with a convertiplane or a gyrodyne, the wings of the aircraft each comprise a wing box connected to the fuselage in a fixed manner and movable appendages.

These movable appendages are hinged to the main body so as to define respective trailing edges of the corresponding wings.

Ailerons and flaps constitute examples of these movable appendages.

Ailerons are adapted to control the aircraft's roll, i.e. the inclination of the aircraft about a longitudinal axis of the fuselage.

To that end, ailerons are tilted in mutually opposite directions with respect to the fuselage, so as to increase the lift of one wing and reduce the lift of the other wing.

Instead, flaps are both tilted in the same direction, so as to increase or reduce the overall lift generated by the wings.

In order to reduce overall dimensions, it is also known to combine the aileron and the flap in a single movable appendage, known in the aviation industry as a flaperon.

Flaperons act like flaps, i.e. reduce or increase the lift generated by the wings, in the aircraft's take-off or landing phase.

Flaperons act like ailerons, i.e. reduce the lift of one wing and increase the lift of the other wing, when it is necessary for the aircraft to perform a roll manoeuvre.

In order to improve the aerodynamic efficiency of the wings when the convertiplane is in the aeroplane configuration, it is necessary to reduce as far as possible any interruption in the airflow at the interface between the wings and the respective movable appendages.

In other words, it is necessary to ensure that the airstream flows in the least disturbed manner at the interface between the wings and the respective movable appendages.

More specifically, each aperture between the trailing edge of the wings and the movable appendages causes a substantial increase in the overall resistance generated by the aircraft's wings, with negative consequences on the aircraft's payload and performance.

In order to reduce these negative effects, U.S. Pat. No. 5,094,412 describes a convertiplane equipped with flaperons. Each flaperon comprises an associated leading edge hinged to a trailing edge of the associated wing.

For each wing, this convertiplane also comprises a sealing element interposed between the respective wing and the corresponding flaperon, which is adapted to close the aperture between them when the corresponding flaperon is operated.

In particular, the convertiplane comprises a connecting structure for each wing configured so as to arrange the associated sealing element in a closing position of the aforementioned aperture, for predetermined angular positions of the flaperon when the flaperon is operated.

Each wing also comprises an end spar arranged at the side of an associated trailing edge and having a flat section in a plane orthogonal to the wing's direction of extension.

The above-described solutions allow room for improvement.

In particular, the sealing elements define additional elements, which require specific space occupation and dedicated connection structures.

There is awareness in the industry of the need to optimize the aerodynamic behaviour of the interface between each wing box and the associated movable appendage for different tilt angles of the movable appendages, whilst limiting, as far as possible, the bulk of the wing and simplifying manufacture.

There is also awareness in the industry of the need for arranged movable appendages that, in addition to enabling control of the convertiplane in the "aeroplane" configuration, interfere as little as possible with the downwash generated by the action of the rotors when the convertiplane is in the "helicopter" configuration.

This need is exacerbated in the previously mentioned implementation solution, where the nacelles are fixed with respect to the wings and the rotors are tiltable with respect to the associated nacelles.

In fact, in this solution, the surface of the nacelles exposed to the rotors' downwash is particularly significant, therefore penalizing the efficiency of the rotors in the "helicopter" configuration and resulting in the need for larger rotors, with evident problems of overall bulk.

There is also awareness in the industry of the need to increase the available space inside the wings for fuel and/or raising the torsional stiffness of the wings.

There is also awareness in the industry of the need to protect the rotors' interconnection shaft.

DISCLOSURE OF INVENTION

The object of the present invention is the embodiment of a wing for an aircraft that enables satisfying at least one of the above-specified needs in a simple and inexpensive manner.

According to the invention, this object is achieved by a wing for an aircraft as claimed in claim 1.

BRIEF DESCRIPTION OF THE DRAWINGS

For a better understanding of the present invention, two non-limitative preferred embodiments are described hereinafter, purely by way of example and with the aid of the accompanying drawings, in which.

BEST MODE FOR CARRYING OUT THE INVENTION

Referring to FIGS. 1 to 8, reference numeral 1 indicates an aircraft, in particular a convertiplane.

The convertiplane 1 basically comprises:
- a fuselage 2 having an axis A of longitudinal extension;
- a pair of cantilever wings 3 extending from respective mutually opposite sides of the fuselage 2 and transversely to axis A;
- a pair of nacelles 4 housing respective engines, not shown, and fixed with respect to the corresponding wings 3; and
- a pair of rotors 5 operatively connected to the respective engines.

The fuselage 2 also comprises a nose 12 arranged at the front and a tail portion 13, opposite to each other along axis A.

The free edges 9 of the respective wings 3 opposite to the fuselage 2 are aligned along an axis E orthogonal to axis A.

Figure 1:
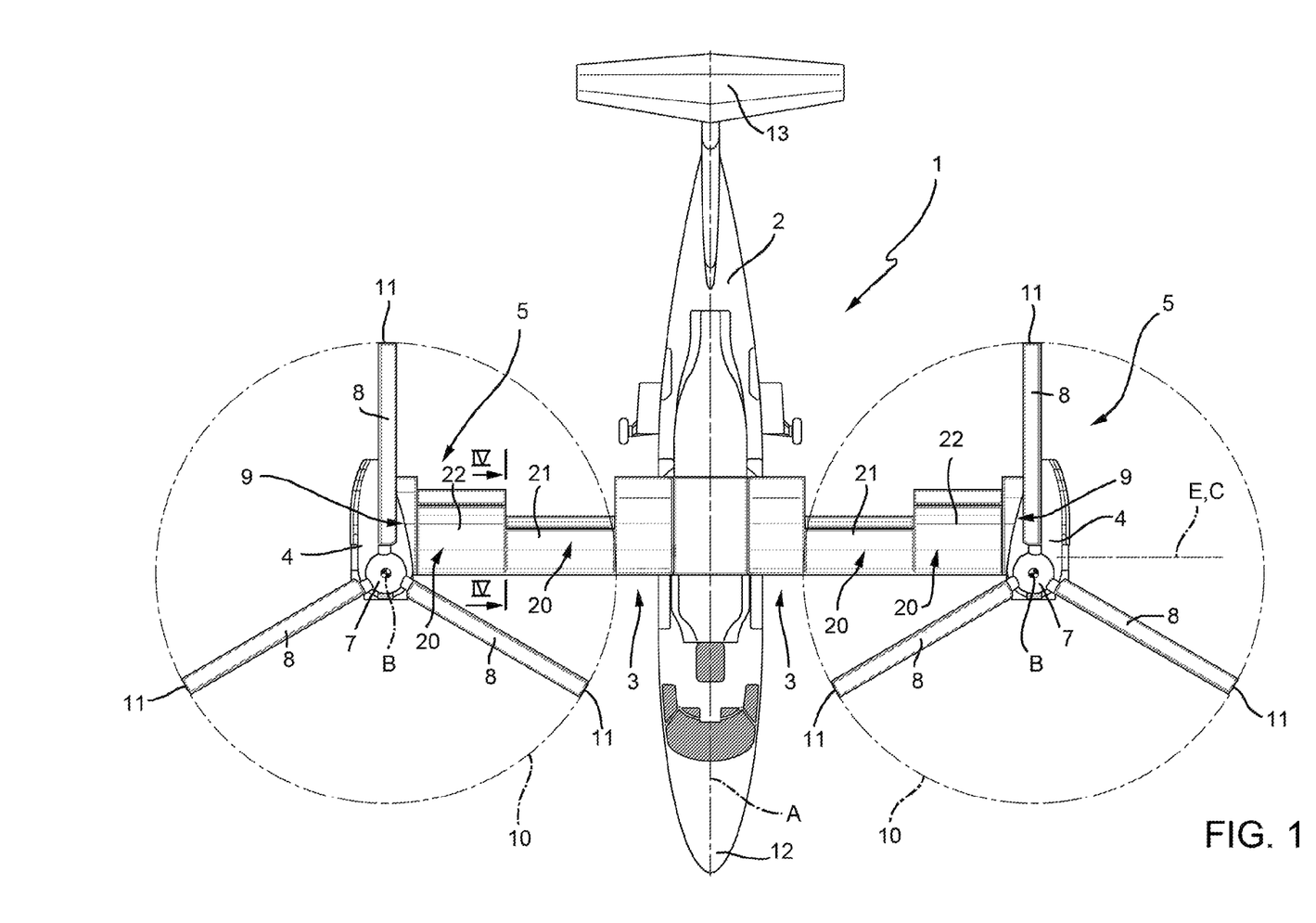
FIG. 1 is a top view of a convertiplane comprising a pair of wings made according to the principles of a first embodiment of the present invention in a "helicopter" configuration.

It should be noted that the terms "at the front", "tail", "longitudinal", "side", "above", "below" and the like used in this description refer to the normal direction of forward flight of the convertiplane 1 shown in FIGS. 1 to 3.

In greater detail, each rotor 5 basically comprises:
a drive shaft rotatable about an axis B;
a hub 7 driven in rotation by the drive shaft; and
a plurality of blades 8 hinged on the hub 7.

The rotors 5 are tiltable about an axis C with respect to the associated wings 3 and the associated nacelles 4.

Axis C is transversal to axis A and axes B.

Axis C is also parallel to axis E.

The convertiplane 1 can be selectively arranged:
in a "helicopter" configuration (shown in FIG. 1), in which the axes B of the rotors 5 are orthogonal to axis A and axis C; and
in an "aeroplane" configuration (shown in FIG. 2), in which the axes B of the rotors 5 are parallel to axis A and orthogonal to axis C.

Since the rotors 5 are identical, reference will be made hereinafter to an individual rotor 5.

The blades 8 extend along respective axes and comprise respective free tips 11.

During rotation, the free tips 11 of the blades 8 of the rotor 5 trace an imaginary circumference indicated hereinafter in this description as the rotor disc 10.

Since the wings 3 are identical, reference will be made hereinafter to an individual wing 3 of the convertiplane 1 for brevity of description.

In greater detail, the wing 3 comprises:
a wing box 20; and
a pair of movable appendages 21 and 22 independently hinged to the wing box 20, in particular, hinged on the wing box 20 about axis E.

Furthermore, the rotor 5 is arranged at the edge 9 of the wing 3.

In particular, the movable appendages 21 and 22 are arranged one after the other along the axis E, proceeding from the fuselage 2 towards the rotor 5.

With particular reference to the "helicopter" configuration shown in FIG. 1, the movable appendages 21 and 22 are arranged below the rotor 5.

In other words, the movable appendages 21 and 22 are arranged inside the ideal cylinder obtained by extending the rotor disc 10 parallel to axis B.

More specifically, movable appendage 21 is arranged below the rotor disc 10, i.e. in the area where the blades 8 have the maximum tangential speed and where the effect of the downwash generated by the rotor 5 is greater.

The wing box 20 comprises (FIG. 7):
a plurality of ribs 25a and 25b lying on respective planes orthogonal to axis E and extending parallel to axis A;
a plurality of spars 26a, 26b and 26c extending parallel to axis E, orthogonal to the ribs 25a and 25b and spaced from each other along the axis A; and
a covering 27 adapted to give the wing box 20 the shape of a wing profile 28 of the desired aerodynamic form.

In turn, the covering 27 defines:
a leading edge 29 facing towards the nose 12 and extending parallel to axis E;
a trailing edge 30 facing towards the tail portion 13, extending parallel to axis E and opposite to leading edge 29 with respect to axis A;
an aerodynamically shaped first surface, defined hereinafter as the top surface 31, extending between the leading edge 29 and the trailing edge 30; and
an aerodynamically shaped second surface, defined hereinafter as the bottom surface 32, extending between the leading edge 29 and the trailing edge 30 on the side opposite to the top surface 31.

Proceeding from the trailing edge 30 to the leading edge 29, the spars 26a, 26b and 26c are arranged in sequence.

The appendages 21 and 22 are arranged on the side of the trailing edge 30 of the wing box 20.

Each appendage 21, 22 defines a respective wing profile 35, 36 and, in turn, comprises:
a respective end wall 41 or 42 hinged to the wing box 20;
a respective trailing edge 43 or 44 opposite to wall 41 or 42;
a respective aerodynamically shaped surface, defined hereinafter as top surface 45 or 46, which extends between the respective wall 41 or 42 and the associated trailing edge 43 or 44; and
a respective aerodynamically shaped surface, defined hereinafter as bottom surface 47 or 48, which extends between the respective wall 41 or 42 and the associated trailing edge 43 or 44 on the side opposite to the corresponding top surface 45 or 46.

Appendage 22 is hinged to the wing box 20 parallel to axis E.

When the convertiplane 1 is in the "aeroplane" configuration (FIG. 2), appendage 22 is controlled like a flaperon.

Figure 2:
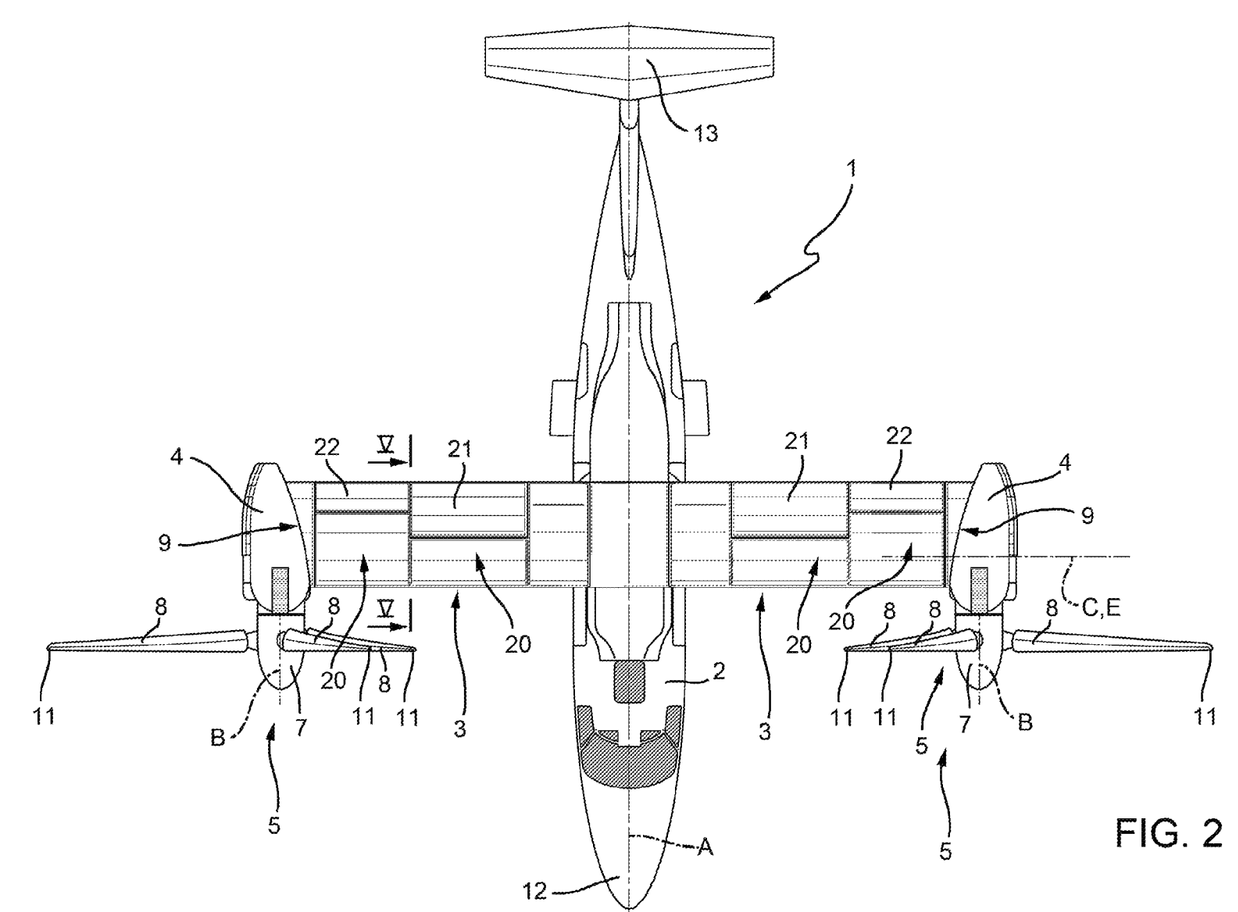
FIG. 2 is a top view of the convertiplane in FIG. 1 in an "aeroplane" configuration.
Figure 3:
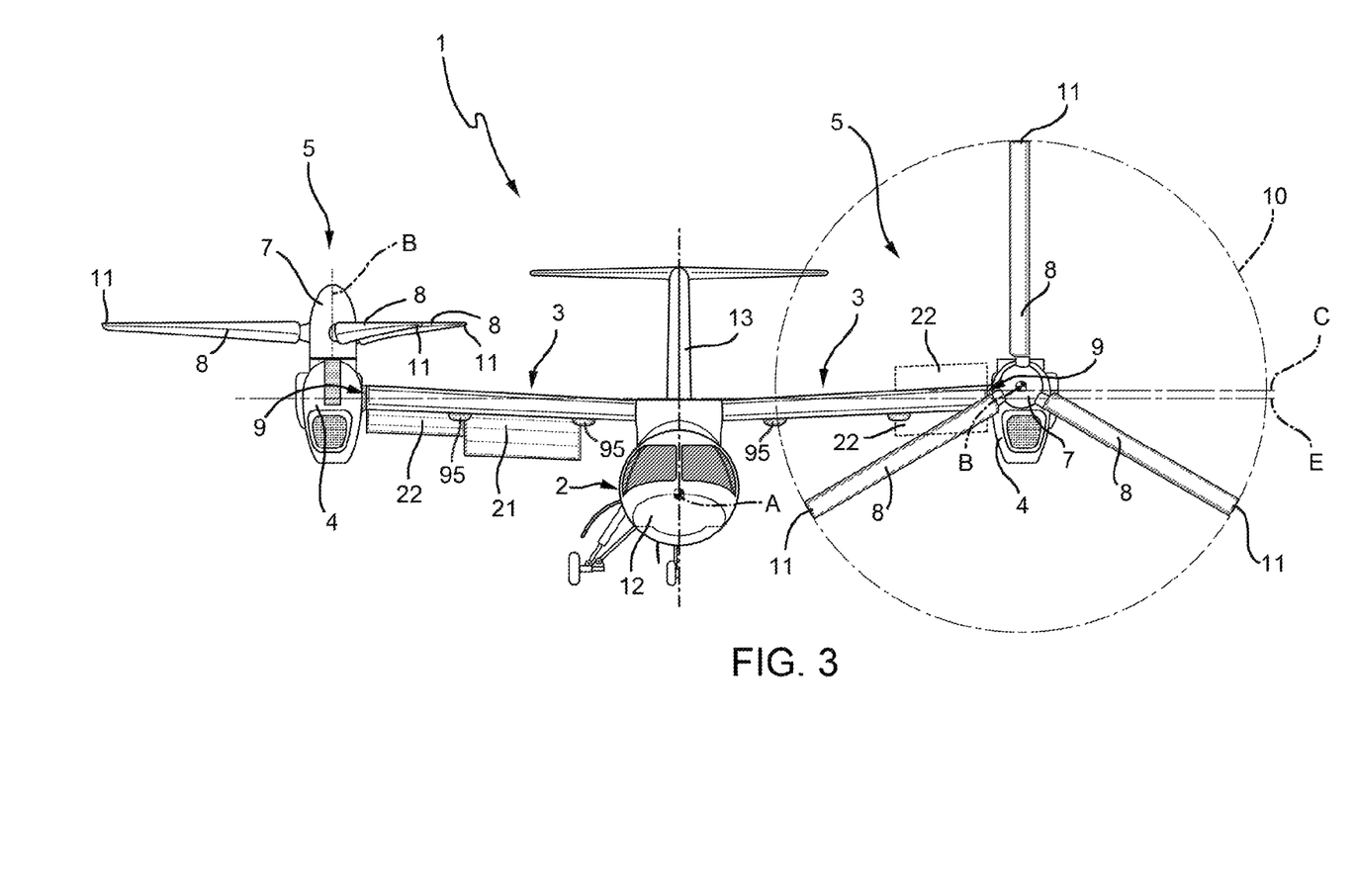
FIG. 3 is a front view of the convertiplane of FIGS. 1 and 2, showing the left wing in the "helicopter" configuration and the right wing in the "aeroplane" configuration.

More specifically, appendage 22 is normally arranged in a neutral position, shown in FIG. 2, where the top surface 46 and bottom surface 48 define respective extensions of the top surface 31 and bottom surface 32 of the wing box 20.

Furthermore, appendage 22 is selectively movable from the neutral position to a first raised operating position and a second lowered operating position.

In particular, by setting one of appendages 22 in the first raised position and the other appendage 22 in the second lowered operating position, it is possible to generate a roll moment about axis A on the aircraft 1.

Contrariwise, by setting both appendages 22 in the respective first raised operating positions or second lowered operating positions, the overall lift generated by the wings 3 is respectively reduced or increased.

Preferably, appendages 22 can be selectively arranged in respective third raised operating positions, interposed between the respective neutral positions and first raised operating positions, when the convertiplane 1 exceeds a certain cruising speed, so as to define air brakes.

In the case shown, the angle between the neutral position and the first raised operating position is 30 degrees. The angle between the neutral position and the second lowered operating position is 30 degrees. The angle between the neutral position and the third raised operating position is approximately 5 degrees.

When the convertiplane 1 is in the "helicopter" configuration (FIG. 1), appendage 22 is arranged in a fourth lowered position.

Preferably, the angle α of movement of appendage 22 between the fourth lowered position and the neutral position is variable according to the forward speed of the convertiplane 1 in "helicopter" mode.

The maximum angle α of the aforementioned movement is greater than the angle defined by appendage 22 between the second lowered operating position and the neutral position and, in the case shown, is equal to 70 degrees.

The movement of appendage 22 from the neutral position to the fourth lowered position takes place following the transition of the convertiplane 1 from the "aeroplane" configuration to the "helicopter" configuration and vice versa.

Alternatively, this movement takes place when the forward speed of the convertiplane 1 drops below a threshold value.

Appendage 21 is movable with respect to the wing box 20 between:
- a first neutral position (FIG. 5), in which the wing profiles 35 and 28 are contiguous with one another, and the portion of top surface 45 and bottom surface 47 adjacent to the trailing edge 43 define respective extensions of the top surface 31 and of the bottom surface 32 of the wing box 20; and
- a second lowered operating position (FIG. 4), in which the wing profiles 35 and 28 are separated from each other, and top surface 45 and bottom surface 47 are respectively separated from the top surface 31 and from the bottom surface 32 of the wing box 20.

Advantageously, spar 26a is curved in a plane orthogonal to axis E and wall 41 of appendage 21 is arranged abutting its entire length against spar 26a when appendage 21 is in the first neutral position.

In greater detail, in the first neutral position (FIG. 6), wing profiles 35 and 28 are contiguous with each other, and the portions of top surface 45 and bottom surface 47 adjacent to the trailing edge 43 define respective extensions of the top surface 31 and bottom surface 32 of the wing box 20.

In the second lowered operating position (FIG. 4), wing profiles 35 and 28 are separated from one another, and top surface 45 and bottom surface 47 are respectively separated from the top surface 31 and bottom surface 32 of the wing box 20.

The top surface 45 of appendage 21 defines an extension of spar 26a when appendage 21 is in the second lowered position.

Figure 7:
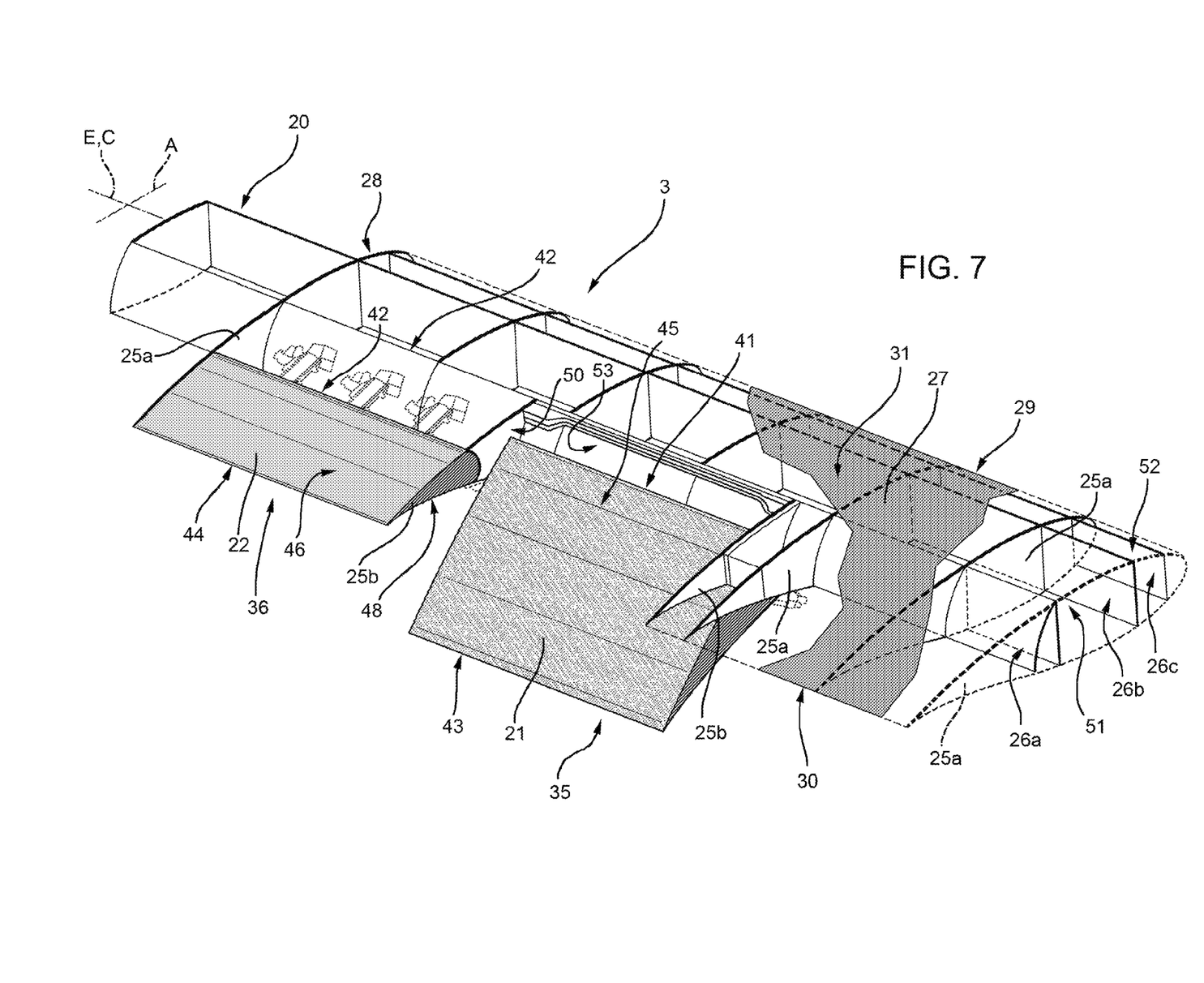
FIG. 7 is a perspective view of the wing of FIGS. 1 to 6, with parts removed for clarity.

The wing box 20 defines an opening 50, open on the side opposite to the leading edge 29 and delimited by two mutually consecutive ribs 25b and a section 53 of spar 26a extending between the ribs 25b (FIG. 7).

The trailing edge 30 of the wing box 20 is interrupted at this opening 50.

Figure 5:
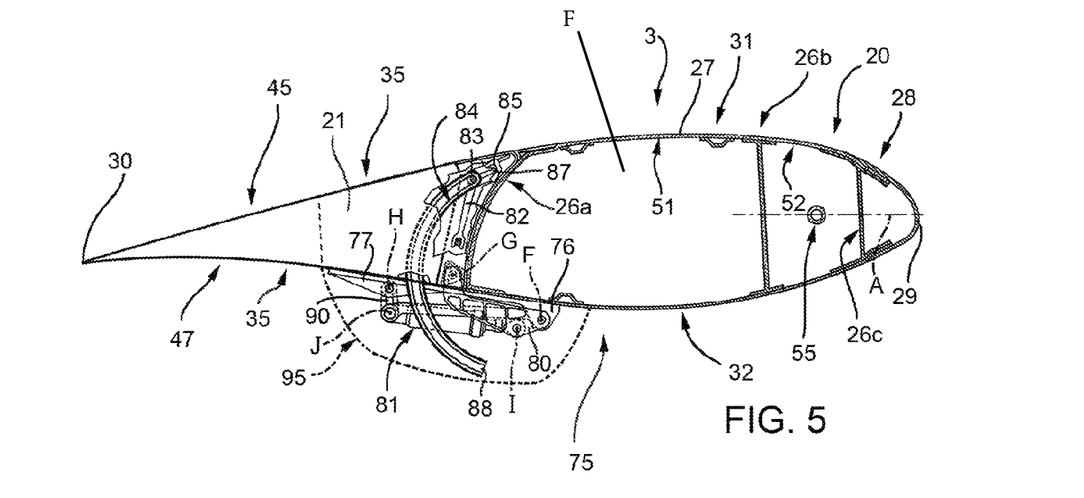
FIG. 5 is a section along the line V-V of FIG. 2 of the wing of FIGS. 1 to 4 in a second operating configuration.

Appendage 21 is at least partly housed inside the opening 50 when it is arranged in the first neutral position (FIG. 5).

More specifically, wall 41 and the portions of top surface 45 and bottom surface 47 adjacent to wall 41 are housed inside the opening 50 when appendage 21 is arranged in the first neutral position.

Wall 41 also has a curvature facing trailing edge 43, proceeding from top surface 45 towards the bottom surface 47 in a section obtained in a plane orthogonal to axis E.

When the convertiplane 1 is in the "aeroplane" configuration (FIG. 2), appendage 21 is arranged in the first neutral position.

In this first neutral position, the airflow flowing along the wing box 20 and appendage 21 does not effectively undergo any interruption, optimizing the behaviour of the wing 3 when the convertiplane 1 is in the aeroplane configuration.

Contrariwise, when the convertiplane 1 is in the "helicopter" configuration, appendage 21 is arranged in the second lowered operating position.

In this second lowered operating position, the downwash generated by the rotor 5 flows along spar 26a and through the opening 50. In consequence, appendage 21 interferes in a substantially limited manner with the downwash generated by the rotor 5, optimizing the behaviour of the wing 3 when the convertiplane 1 is in the "helicopter" configuration.

Referring to the "aeroplane" configuration of the convertiplane 1, the trailing edge of the wing 3 is defined by the trailing edge 30 of the wing box 20 and by the trailing edge 44 of appendage 22 between ribs 25a and 25b, and by the trailing edge 43 of appendage 21 between ribs 25b.

Furthermore, wing box 20 defines:
- a compartment 51 delimited by spars 26a and 26b and the portions of top surface 31 and bottom surface 32 between these spars 26a and 26b; and
- a compartment 52 delimited by spar 26b and 26c and the portions of top surface 31 and bottom surface 32 range between these spars 26b and 26c.

Compartment 51 defines a portion of a fuel tank (F) as shown in FIG. 5.

Compartment 52 houses an interconnection shaft 55, which connects the rotors 5 to each other.

In particular, spar 26a has a C-shaped section and spars 26b and 26c have an I-shaped section in a plane orthogonal to axis E.

Furthermore, spar 26a has a curvature facing the trailing edge 30 in a plane orthogonal to axis E, proceeding from the top surface 31 to the bottom surface 32 of the wing box 20.

The convertiplane 1 further comprises:
- a control unit 70 (only schematically shown in FIG. 6);
- a plurality, three in the case shown, of actuating mechanisms (not described in detail as they do not form part of the present invention) functionally connected to the control unit 70 for moving appendage 22 between the respective neutral and operating positions; and
- a pair of actuating mechanisms 75 (FIGS. 4 to 7) functionally connected to the control unit 70 for moving appendage 21 between the respective first neutral positions and the second operating positions.

Figure 6:
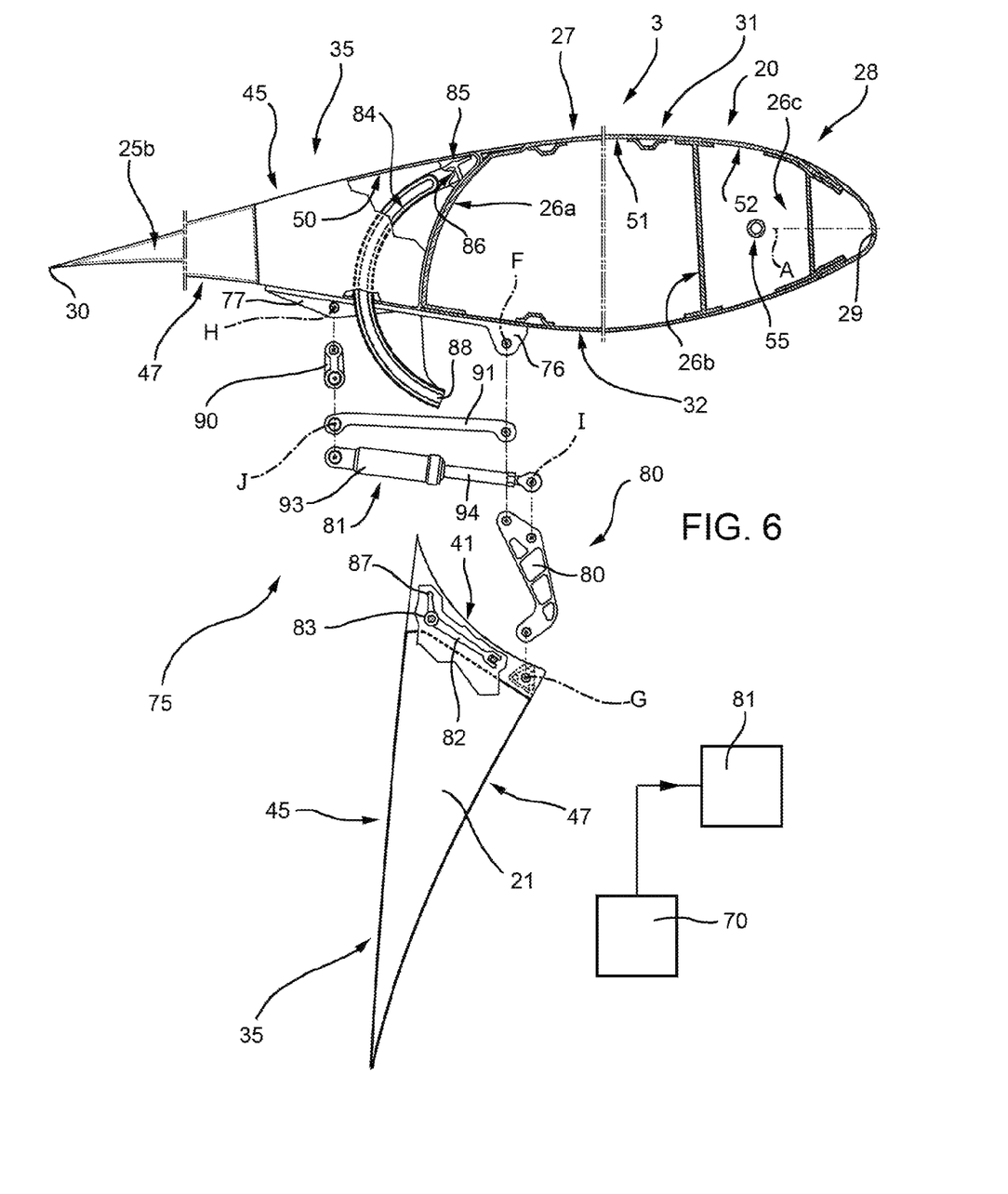
FIG. 6 is an exploded side view of the wing of FIGS. 1 to 5 in the second operating configuration.
Figure 8:
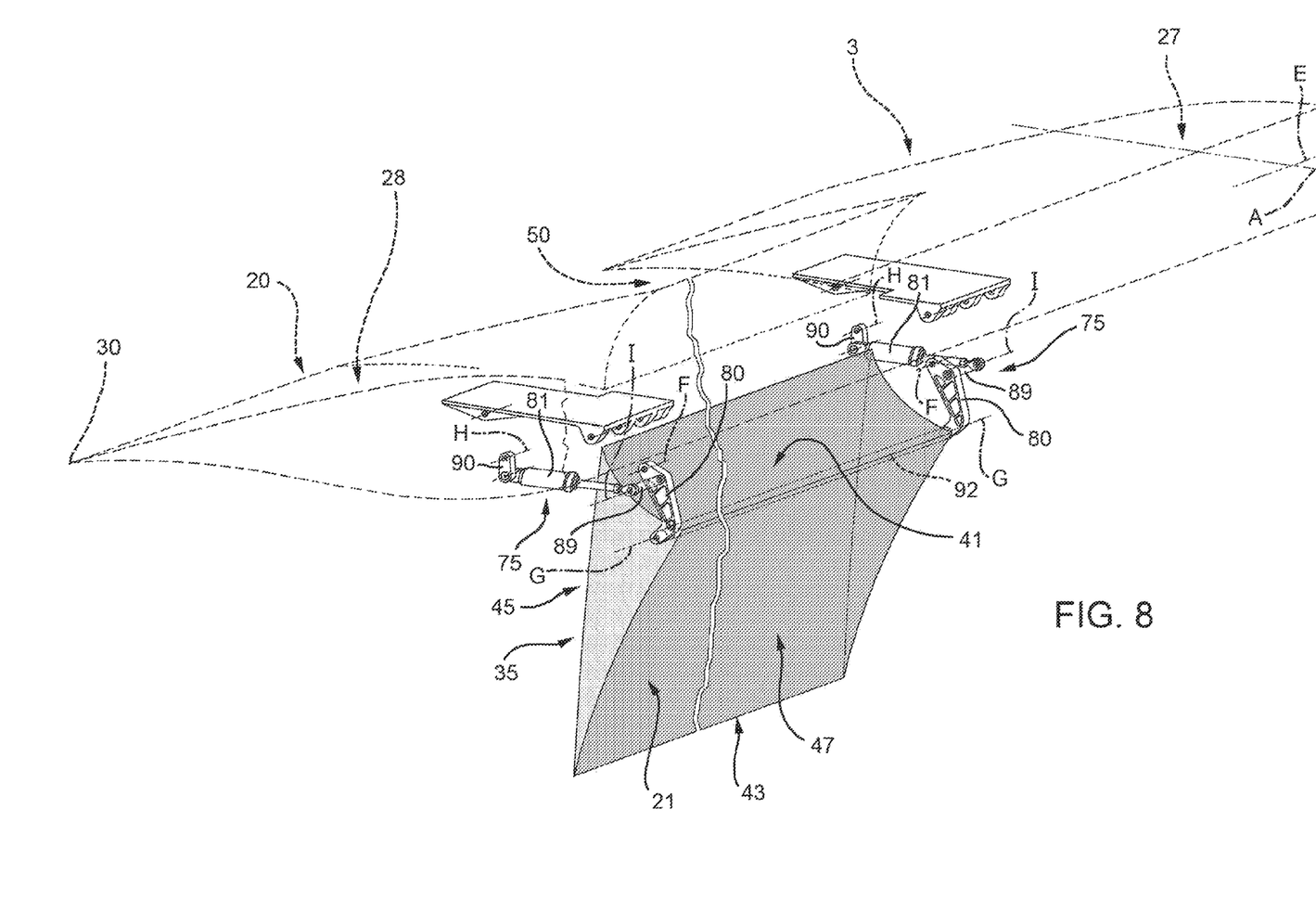
FIG. 8 is a further perspective view of the wing of FIGS. 1 to 7 from a different viewing angle, with parts removed for clarity.

In greater detail, the actuating mechanisms 75 are arranged on respective mutually opposite side edges of appendage 21, as shown in FIGS. 6 and 8.

Each actuating mechanism 75 comprises:
- a lever 80 hinged to the wing box 20 about an axis F defined by the bottom surface 32 in a position interposed between spars 26a and 26b and hinged to wall 41 of appendage 21 about an axis G; and
- a variable-length telescopic actuator 81 controlled by the control unit 70, hinged with respect to an axis H arranged on the bottom surface 32 of the wing box 20 in a position interposed between spar 26a and the trailing edge 30, and hinged to the lever 80 about an axis I in an intermediate position between axes F and G.

In particular, the actuator 81 comprises a sleeve 93 and a piston 94, sliding with respect to the sleeve 93.

In the case shown, axes F, G, H and I are parallel to one another and parallel to axis E.

In addition, the axes H and F of each actuating mechanism 75 are arranged on respective brackets 77 and 76 fixed to the respective rib 25b.

Each actuating mechanism 75 further comprises:
- an arm 82 carried by appendage 21 and fitted with a roller 83; and
- a slot 84 having a C-shaped section in a plane orthogonal to axis E and defined by the wing box 20 in a position interposed between spar 26a and the trailing edge 30.

The roller 83 slides inside the slot 84 following the movement of appendage 21 from the second lowered position to the first neutral position.

The wing box 20 further comprises a pair of stop elements 85 defining respective seats 86 engaged by corresponding projections 87 carried by respective arms 82, when appendage 21 is in the first position.

In particular, each projection 87 extends from the roller 83 in a direction transversal to the associated arm 82.

Each actuating mechanism 75 further comprises:
a connecting rod 90 hinged to the wing box 20 about axis H and to which the respective actuator 81 is hinged about an axis J; and
a pair of rods 91 hinged to the associated connecting rod 90 about the associated axis I, and to the wing box 20 and to the lever 80 about axis F.

Axes J are parallel to respective axes F, G, H and I.

The levers 80 of the actuating mechanisms 75 are connected to each other by a rod 92 (shown in FIG. 8), so as to ensure the correct movement of appendage 21 in the event of one of the actuating mechanisms 75 failing.

As shown in FIG. 8, the actuator 81 and the lever 80 of each actuating mechanism 75 lie on respective planes orthogonal to axis E, parallel to and spaced apart from each other.

The hinge between the actuator 81 and the lever 80 about axis I of each actuating mechanism 75 is obtained via an associated pin 89 (FIG. 8) extending along the corresponding axis I and connected to the respective actuator 81 and lever 80.

The slot 84 of each actuating mechanism 75 is interposed between the corresponding actuator 81 and lever 80 along the corresponding axis E.

The slot 84 of each actuating mechanism 75 is open on the side of the associated arm 82 and is defined by the associated rib 25*b*.

Each slot 84 extends from the associated seat 86 defined by the top surface 31 of the wing box 20 up to a free end 88 arranged below the bottom surface 32 of the wing box 20.

More specifically, each slot 84 has a curvature facing the trailing edge 30 in a plane orthogonal to axis E, proceeding from the associated seat 86 to the associated end 88.

The actuator 81 of each actuating mechanism 75 is interposed between the respective rods 91 along the corresponding axis E.

When appendage 21 is in the neutral position (FIG. 5), the actuator 81, lever 80, rods 91 and axis G of each actuating mechanism 75 are contained within the space occupied by the associated slot 84 in a plane orthogonal to axis E.

Preferably, the axes of extension of the actuator 81, lever 80 and rods 91 of each actuating mechanism 75 are substantially parallel to one another.

Contrariwise, when appendages 21 are arranged in the lowered operating position (FIG. 4), axes G are positioned below, in a plane orthogonal to axis E, at the free ends 88 opposite to the stop elements 85 of the respective slots 84.

In this condition axes G and arms 82 are preferably arranged below ends 88 in a plane orthogonal to axis E.

The wing 3 also comprises a fairing 95 (only schematically shown in FIGS. 4 and 5) housing the actuating mechanism 75 when appendage 21 is in the first neutral position, to limit its effect on the aerodynamics of the convertiplane 1.

This fairing 95 is opportunely configured to allow the lowering of appendage 21 and the movement of the actuating mechanisms 75, when appendage 21 moves between the first neutral position and the second lowered operating position.

The functioning of the convertiplane 1 is described below in detail, starting from the "aeroplane" configuration of the convertiplane 1 shown in FIG. 1 (FIG. 2) and with reference to a single wing 3.

In this condition, axis B of the rotor 5 is parallel to axis A and orthogonal to axis C.

In this "aeroplane" configuration, appendage 21 is arranged in the first neutral position and appendage 22 is controlled like a flaperon.

In this first neutral position, wall 41 of appendage 21 abuts against spar 26*a*, and the frontal portion of appendage 21 engages in the opening 50.

In other words, appendage 21 defines an extension of the wing box 20. Moreover, the actuating mechanism 75 is housed inside the fairing 95.

Consequently, the airflow flowing along the wing box 20 and appendage 21 does not effectively undergo any interruption, optimizing the behaviour of the wing 3 when the convertiplane 1 is in the aeroplane configuration.

In greater detail, appendage 22 is normally arranged in the neutral position, shown in FIG. 2, and is selectively movable to the first raised operating position or the second lowered operating position.

In particular, if it necessary to respectively lower or increase the lift generated by the wings 3, both appendages 22 are arranged in the respective first raised operating positions or second lowered operating positions. In these conditions, appendages 22 act like flaps. Contrariwise, if it is necessary to generate a roll moment directed about axis A on the convertiplane 1, one of appendages 22 is arranged in the first raised position and the other appendage 22 is arranged in the second lowered position. In these conditions, appendages 22 behave like traditional ailerons.

In special flight operating conditions, appendages 21 and 22 are selectively arranged in the respective third raised operating positions, where they define air brakes.

In the case where it is necessary to operate the convertiplane 1 in the "helicopter" configuration, the rotors 5 are turned 90 degrees towards the tail portion 13 of the fuselage 2 about axis C. At the end of this rotation, axes B are orthogonal to axis A and axis C (FIG. 1).

In this condition, the downwash generated by the rotor 5 strikes the portion of the wing 3 defining appendages 21 and 22. This downwash generates the lift necessary to allow the convertiplane 1 to lift off in flight in the "helicopter" configuration.

In addition, the opening 50 of the wing box 20 is arranged below the rotor disc 10, i.e. in the area where this downwash generated by the rotor 5 is more intense.

In this "helicopter" configuration, appendage 21 is arranged in the second lowered operating position and appendage 22 is arranged in the fourth lowered position.

As appendage 21 is arranged in the lowered position (FIG. 4), the downwash generated by the rotor 5 flows through the opening 50 freed by appendage 21. Furthermore, this airflow flows substantially undisturbed along spar 26*a* and the top surface 45 of appendage 21, which effectively defines an extension.

This airflow also flows through the opening delimited by the wing 3 and left free by appendage 22 arranged in the fourth lowered position.

The control unit 70 moves appendage 21 between the first neutral position and the second lowered operating position via actuating mechanism 75. Similarly, the control unit 70 moves appendage 22 between the neutral position, the first raised operating position, the second lowered operating position, the third raised position and the fourth lowered position, via an actuating mechanism not shown and not forming part of the present invention.

More specifically, if the pilot or an automatic pilot system, not shown, activates the transformation of the convertiplane 1 from the "aeroplane" configuration to the "helicopter" configuration, the control unit 70 moves appendage 21 from the first neutral position (FIG. 5) to the second lowered operating position (FIG. 4) and appendage 22 to the fourth lowered operating position.

In greater detail, in the first neutral position of appendage 21, the projection 87 of each actuating mechanism 75 engages the seat 86 and the lever 80 is arranged substantially parallel to actuator 81 and the connecting rod 90.

Starting from this configuration, shown in FIG. 5, the control unit 70 controls the extension of the piston 94 of each actuator 81 in relation to the respective sleeve 93. This causes the rotation of the levers 80 about axis F in the anticlockwise direction, with reference to FIG. 4, and the consequent rotation of wall 41 and appendage 21 about the movable axis G in the anticlockwise direction.

This causes the rollers 83 to advance in the anticlockwise direction inside the slots 84 until the ends 88 are reached.

Figure 4:
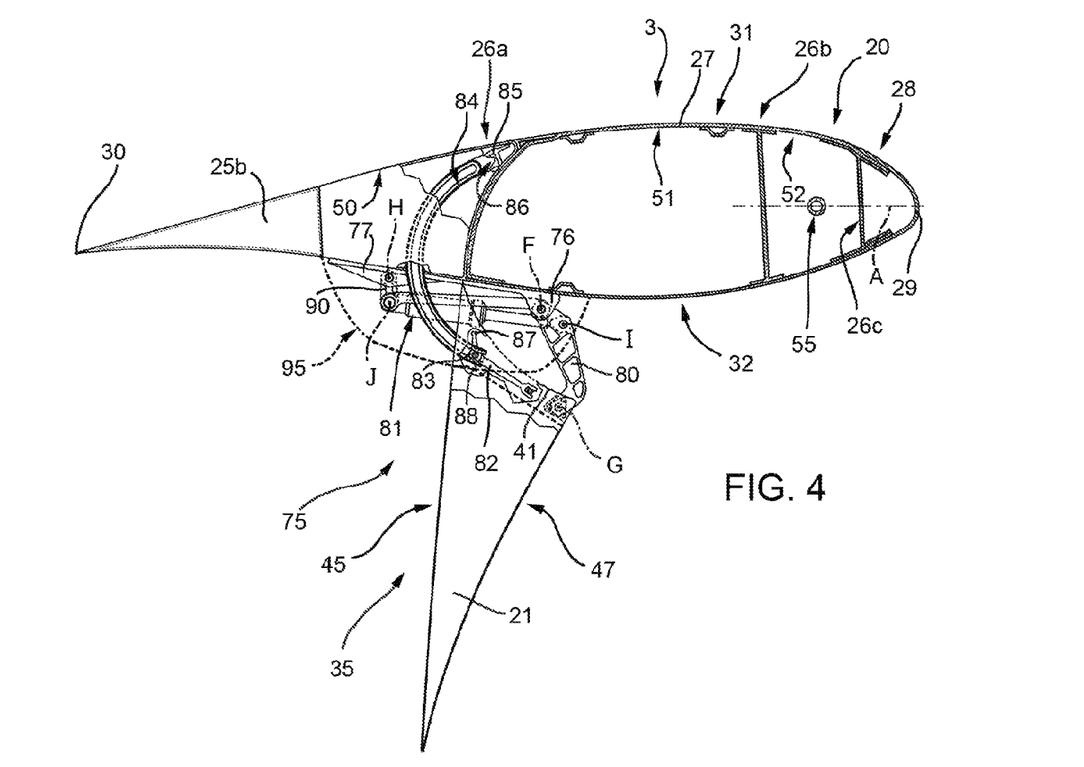
FIG. 4 is a section along the line IV-IV of FIG. 1 of the wing of FIGS. 1 to 3 in a first operating configuration.

In a totally similar manner, in the case where appendage 21 must be moved from the second lowered operating position to the first neutral position, the control unit 70 controls, starting from the condition in FIG. 4, the sliding of the pistons 94 inside the sleeves 93 of the respective actuator 81. This causes the rotation of the levers 80 about axis F in the clockwise direction, with reference to FIG. 4, and the consequent rotation of wall 41 and appendage 21 about the movable axis G in the clockwise direction.

Consequently, the rollers 83 advance in a clockwise direction inside the respective slots 84 until engaging the respective stop elements 85. In this situation, appendage 21 is in the first neutral position, as shown FIG. 5.

Rod 92 ensures the correct movement of the levers 80 in the event of one of the actuators 81 failing.

Furthermore, appendage 21 passes through the gap between the adjacent fairings 95 when set in the second lowered operating position.

Figure 9:
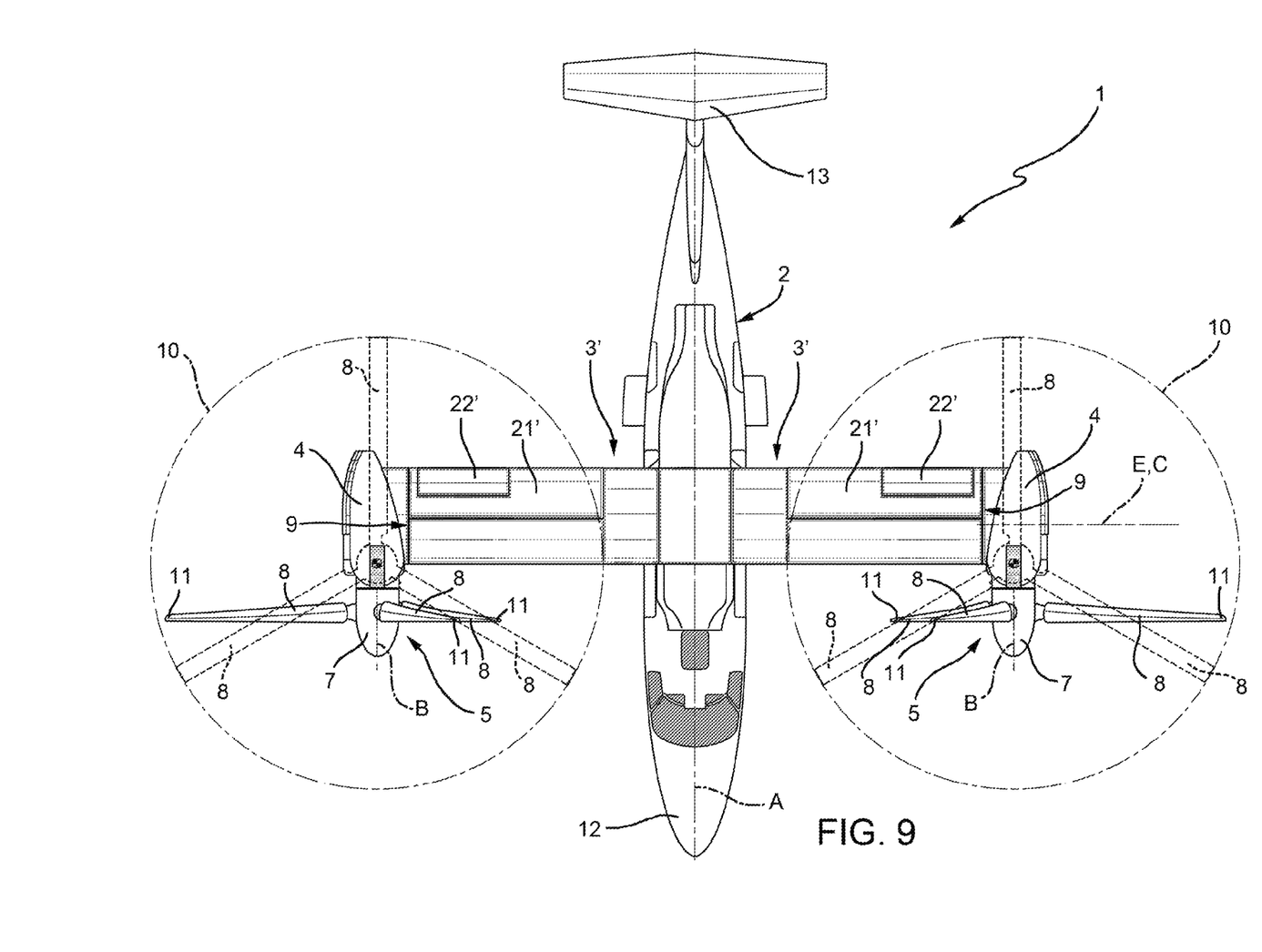
FIG. 9 is a top view of a convertiplane comprising a pair of wings made according to a further embodiment of the present invention in the "helicopter" configuration.

Referring to FIG. 9, reference numeral 3' indicates a wing according to a second embodiment of the present invention.

Wing 3' is similar to wing 3 and will be described hereinafter only with regard to the differences; where possible, the same or equivalent parts of wings 3 and 3' will be indicated with the same reference numerals.

In particular, wing 3' differs from wing 3 in that appendage 21' extends up to the nacelle 4 and in that appendage 22' is arranged within appendage 21' in a position close to the nacelle 4.

From an examination of the characteristics of the wing 3 and 3' made according to the present invention, the advantages that can be attained therewith are evident.

In particular, spar 26a has a curved shape in section orthogonal to axis E and abuts against the entire length of wall 41, when appendage 21 is in the respective first neutral position (FIG. 5).

Due to this, the airflow that flows over the wing box 20 and appendage 21 arranged in the first neutral position does not effectively undergo any interruption, optimizing the efficiency of the wing 3 and 3' when the convertiplane 1 is in the "aeroplane" configuration.

Unlike the known solutions discussed in the introductory part of this description, this increase in efficiency is achieved without the use of additional sealing elements. Consequently, the overall bulk of the wing 3 and 3' is less and the overall design is particularly simplified.

This increase in efficiency of the wing 3 and 3' is further augmented because appendage 21 is partly housed in the opening 50 defined by the wing box 20. A further increase in efficiency of the wing 3 and 3' derives from the actuating mechanisms 75 being housed inside the fairing 95 when the wing 3 and 3' is in the first neutral position, thereby limiting the resistance of the profile of the wing 3 and 3'.

As shown in FIG. 4, the top surface 45 of appendage 21 defines an extension of spar 26a when appendage 21 is in the second lowered operating position and the convertiplane 1 is in the "helicopter" configuration.

In this way, the downwash generated by the rotor 5 flows through the opening 50 and along spar 26a and the top surface 45 of appendage 21, which effectively defines an extension of spar 26a. Thus, appendage 21 interferes in an extremely limited manner with the downwash generated by the rotor 5, optimizing the behaviour of the wing 3 even when the convertiplane 1 is in the "helicopter" configuration.

This effect is particularly accentuated because appendage 21 is positioned below the rotor disc 10 where the downwash from the rotor 5 reaches the maximum levels of intensity.

Furthermore, this effect enables reducing the necessary diameter of the rotor 5 and being able to increase the chord of the wing 3 with respect to known solutions, where the size of the wing 3 along axis A is limited so as not to excessively interfere with this downwash generated by the rotor 5 when the convertiplane 1 is in the "helicopter" configuration.

The above has been found to be particularly advantageous considering that the nacelles 4 of the convertiplane 1 are fixed with respect to the wing 3, and therefore interfere with the aforementioned airflow. In other words, the negative effect of interference with the nacelles 4 is compensated by the positive effect of appendages 21 substantially not interfering with the downwash generated by the rotor 5.

The wing box 20 further defines a compartment 51, delimited by spars 26a and 26b and the portions of the top surface 31 and bottom surface 32 ranging between these spars 26a and 26b, and defining a portion of a fuel tank.

Due to the curved section of spar 26a, this compartment 51 is particularly capacious, thereby raising the overall operating capabilities of the convertiplane 1.

The wing box 20 further defines a compartment 52, delimited by spars 26b and 26c and the portions of the top surface 31 and bottom surface 32 between these spars 26b and 26c, and housing an interconnection shaft 55, which connects the rotors 5 to each other.

It is thus possible to protect the interconnection shaft 55 from the atmospheric agents, with an obvious increase in the ultimate safety of the convertiplane 1.

It is clear that modifications and variants can be made to the wing 3 and 3' set forth herein without departing from the scope defined in the claims.

In particular, wall 41 could be arranged abutting against spar 26a for a limited part of its length, for example only at the top surface 31 and the bottom surface 32.

In addition, the convertiplane 1 could be an aeroplane. In this case, the aeroplane would benefit from all the advantages that the convertiplane 1 benefits from in the "aeroplane" configuration. More specifically, appendages 21 would perform the function of flaperons to control the aeroplane's maneuverability.

The convertiplane 1 could also be a gyrodyne.

Finally, appendages 21 could be selectively arranged in respective third raised operating positions (not shown) when the convertiplane 1 is in the aeroplane configuration, so as to define air brakes.

Each first neutral position of appendages 21 would be angularly interposed between the associated second lowered operating position and the associated third raised operating position.

The invention claimed is:

1. A wing for an aircraft, comprising:
a wing box defining a first wing profile with a first leading edge, a first trailing edge opposite to said first leading edge, a first top surface and a first bottom surface opposite to each other and extending between said first leading edge and first trailing edge;
said first leading edge and first trailing edge extending longitudinally along respective first axes;
a first movable appendage hinged on said wing box and defining a second wing profile, in turn comprising an end wall and a second trailing edge opposite to each other, a second top surface and a second bottom surface opposite to each other and extending between said end wall and said second trailing edge;
said first movable appendage being movable with respect to said wing box between:
a first position, wherein said first and second wing profiles are contiguous with each other, and at least part of said second bottom surface and second top surface define respective extensions of said first bottom surface and first top surface; and
a second position, wherein said second bottom surface and second top surface are respectively separated from said first bottom surface and first top surface;
characterized in that said wing box comprises a first spar having a curved section in a plane orthogonal to the associated first axis;
said end wall being curved and arranged to abut against said first spar at least along said second top surface and said second bottom surface, when said first movable appendage is in said first position;
wherein said end wall abuts against said first spar along an entire length of said end wall in the first position;
wherein the second trailing edge of the first movable appendage aligns with the first trailing edge of the wing in the first position and is forward with respect to the first trailing edge in the second position; and
wherein said first wing profile includes a covering that adapts said wing box into said first wing profile and defines the first leading edge and the first trailing edge, wherein in at least one section of said first wing profile, said first spar is located internal to the covering and is disposed between the first leading edge and the first trailing edge of the wing profile in both the first and second positions of said first movable appendage.

2. The wing according to claim 1, characterized in that said second top surface of said first appendage defines an extension of said first spar, when said first appendage is in said second position.

3. The wing according to claim 1, characterized in that said wing box comprises a plurality of ribs extending transversally to said first spar and defining an opening open on the side opposite to said first leading edge and delimited by a pair of consecutive ribs and a section of said first spar interposed between said ribs along said first axis;
said first trailing edge being interrupted at said opening;
said opening housing, in use, at least a portion of said first movable appendage defining said end wall, when said first movable appendage is in said first position.

4. The wing according to claim 3, characterized in that it comprises a guide having a curved shape in a plane orthogonal to said first axis, and in that said first movable appendage comprises a sliding element, sliding inside said guide following the movement of said first movable appendage between said first and second positions.

5. The wing according to claim 4, characterized in that:
one of said sliding element and said wing box is connected to an end stop seat; and
the other of said sliding element and said wing box is connected to a projection;
said projection engaging said seat when said first movable appendage is arranged in said first position.

6. The wing according to claim 5, further comprising at least one actuating mechanism selectively controllable to move said first appendage between said first position and second position; wherein said guide extends partly inside the opening and partly outside said wing box; and/or
characterized in that said guide comprises an end opposite to said end stop seat and lying on a plane orthogonal to said first axis:
said actuating mechanism being arranged entirely between said end and said end stop seat in a section orthogonal to said first axis when said first appendage is arranged in said first position.

7. The wing according to claim 3, characterized in that it comprises a pair of said actuating mechanisms having respective said first levers connected by a rod.

8. The wing according to claim 3, characterized in that said first spar has a curvature towards said first trailing edge, proceeding from said first top surface towards said first bottom surface;
said wing box comprising a first compartment delimited by said first spar, arranged on the opposite side to said opening with respect to said first spar and at least partly defining a fuel tank.

9. The wing according to claim 1, characterized in that it comprises at least one actuating mechanism selectively controllable to move said first appendage between said first position and second position;
said actuating mechanism comprising:
a first lever hinged to said wing box about a second axis and hinged to said first movable appendage about a third axis; and
a telescopic element of variable length, hinged to said wing box about a fourth axis and hinged to said first lever about a fifth axis;
the variation in length of said telescopic element causing the rotation of said first lever about said second axis and the movement of said first movable appendage between said first and second positions.

10. The wing according to claim 9, characterized in that said third axis is arranged at said end wall of said first movable appendage.

11. The wing according to claim 9, characterized in that it comprises a fairing protruding from said first bottom surface and adapted to house said actuating mechanism, when said first appendage is arranged in said first position.

12. An aircraft, characterized in that it comprises:
a fuselage extending along a sixth axis;
a pair of wings according to claim 1 and projecting in a cantilever fashion from said fuselage; and
a pair of rotors associated with said wings and connected by an interconnection shaft;
said wing box of each said wing comprising a second compartment at least partly housing said interconnection shaft.

13. A convertiplane, characterized in that it comprises:
a fuselage extending along a fifth axis;
a pair of wings according to claim 1;
a pair of nacelles housing respective engines and fixed with respect to said wings; and a pair of rotors associated with said wings, driven by said respective engines, rotatable about respective seventh axes and tiltable about an eighth axis parallel to said first axis between:

a third position, wherein said seventh axes are parallel to said fifth axis, reached when said convertiplane is in an aeroplane configuration; and a fourth position, wherein said seventh axes are orthogonal to said first axis and to said fifth axis, reached when said convertiplane is in a helicopter configuration;

said first movable appendage being arranged, in use, in said first position when said convertiplane is in said aeroplane configuration and being arranged, in use, in said second position when said convertiplane is in said helicopter configuration.

14. The convertiplane according to claim 13, characterized in that each said wing comprises a second movable appendage interposed along said first axis between said first movable appendage and said rotor;

each said rotor comprising a hub and a plurality of blades hinged on said hub; said blades comprising respective tips defining an imaginary rotor disc;

each said imaginary rotor disc being arranged above said first movable appendage when said convertiplane is in said helicopter configuration.

15. A wing for an aircraft, comprising:

a wing box defining a first wing profile with a first leading edge, a first trailing edge opposite to said first leading edge, a first top surface and a first bottom surface opposite to each other and extending between said first leading edge and first trailing edge;

said first leading edge and first trailing edge extending longitudinally along respective first axes;

a first movable appendage hinged on said wing box and defining a second wing profile, in turn comprising an end wall and a second trailing edge opposite to each other, a second top surface and a second bottom surface opposite to each other and extending between said end wall and said second trailing edge;

said first movable appendage being movable with respect to said wing box between:

a first position, wherein said first and second wing profiles are contiguous with each other, and at least part of said second bottom surface and second top surface define respective extensions of said first bottom surface and first top surface; and a second position, wherein said second bottom surface and second top surface are respectively separated from said first bottom surface and first top surface;

characterized in that said wing box comprises a first spar having a curved section in a plane orthogonal to the associated first axis;

said end wall being curved and arranged to abut against said first spar at least along said second top surface and said second bottom surface, when said first movable appendage is in said first position;

wherein said end wall abuts against said first spar along an entire length of said end wall; wherein the first spar has a convex shape; and wherein said first wing profile includes a covering that adapts said wing box into said first wing profile and defines the first leading edge and the first trailing edge, wherein in at least one section of said first wing profile, said first spar is located internal to the covering and is disposed between the first leading edge and the first trailing edge of the first wing profile in both the first and second positions of said first movable appendage.

16. The wing according to claim 15, wherein the end wall has a concave shape.

* * * * *